United States Patent

Penczynski et al.

[11] 3,959,549
[45] May 25, 1976

[54] MULTI-LAYER INSULATION FOR DEEP-COOLED CABLES

[75] Inventors: Peter Penczynski, Erlangen; Peter Jacobsen, Berlin; Günther Matthäus, Spardorf; Peter Massek, Forchheim, all of Germany

[73] Assignee: Siemens Aktiengesellschaft, Munich, Germany

[22] Filed: Aug. 1, 1974

[21] Appl. No.: 493,899

[30] Foreign Application Priority Data
Aug. 8, 1973 Germany................................ 2340228

[52] U.S. Cl................................. 428/213; 428/296; 428/318; 174/110 PM; 156/53
[51] Int. Cl.².......................................... B32B 7/02
[58] Field of Search............... 174/110 PM, DIG. 6; 161/109, 253, 255, 47; 156/53, 56; 428/213, 296, 317, 318, 517

[56] References Cited
UNITED STATES PATENTS

| | | | |
|---|---|---|---|
| 3,376,378 | 4/1968 | Bullock | 174/110 PM |
| 3,393,268 | 7/1968 | Meyer et al. | 156/56 |
| 3,595,982 | 7/1971 | Kafka | 174/DIG. 6 |
| 3,598,691 | 8/1971 | Pasini | 156/53 |
| 3,616,123 | 10/1971 | Reynolds et al. | 161/47 |

FOREIGN PATENTS OR APPLICATIONS

| | | | |
|---|---|---|---|
| 2,014,010 | 10/1971 | Germany | 174/110 PM |
| 1,541,728 | 9/1968 | France | 174/DIG. 6 |

*Primary Examiner*—William J. Van Balen
*Assistant Examiner*—William R. Dixon, Jr.
*Attorney, Agent, or Firm*—Kenyon & Kenyon Reilly Carr & Chapin

[57] ABSTRACT

A multi-layer insulation for deep-cooled cables utilizing insulating foils having a dielectric loss factor less than $5 \times 10^{-5}$ in which a layer of a spun bonded paper of high density polyethylene fibers is placed between each two layers of insulating foil thereby providing sufficient elasticity even when the cable is cooled to a very low temperature to equalize expansion differences occurring in the cable.

4 Claims, 1 Drawing Figure

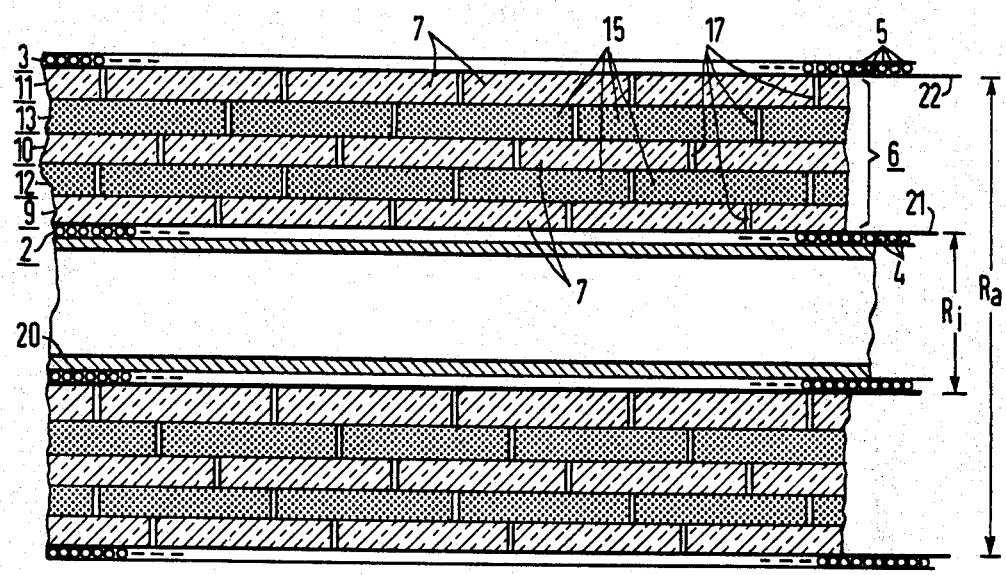

MULTI-LAYER INSULATION FOR DEEP-COOLED CABLES

BACKGROUND OF THE INVENTION

This invention relates to the insulation of deepcooled cables such as super conducting three-phase cables in a coaxial conductor configuration in general, and more particularly to insulation of such cables using insulating foils having a dielectric loss factor smaller than $5 \times 10^{-5}$.

In previously disclosed conductor systems for use in super conducting three-phase cables it is essential that all current losses be avoided in those portions of the cable arranged in the region of the evaporation temperature of liquid helium of about 4K. Thus, arrangements of such cables in which the electromagnetic field acts only between the superconductors are preferred. Because of this, each of the phase conductors of tubular shape has associated with it a coaxial return cable with the three phases of the three-phase cable interlinked at the cable end. As a result, the three return conductors are essentially at the same potential. In such coaxial arrangements, for example, one or plurality of layers of individual, stabilized superconducting wires are employed as conductors. In addition, the layers of superconducting wires can be twisted in such a manner to insure a cable length independent of the temperature when cooled down to low temperature. The concentric arrangement of the superconducting layers with respect to each other is made possible through the use of an electrical insulation layer of tubular design between the respective layers.

The higher limit of current capacity in a superconducting cable made of a superconductive material such as niobium is limited by the critical surface flux density. Because of this, the dielectric properties of the insulating layer of a super-conducting three-phase cable is of great importance for its transmission capacity, and, therefore, for its economy. With the cable diameter generally being fixed, the conductor current cannot exceed a given value without the danger of a transition to the normally conducting state in the superconductive material because of its critical surface flux density limitations. As a result in order to transmit large amounts of electrical power a superconducting three-phase cable must be designed for the highest possible transmission voltages thereby requiring extremely excellent dielectric properties in the electrical insulating layer.

In addition to the high dielectric strength at low temperatures the insulation of the superconducting three-phase cable must also have a very small dielectric loss factor tangent $\delta$ where tangent $\delta$ equals $$\tan \delta = V_d / U^2 \cdot \omega \cdot \epsilon C_o$$

where $V_d$ represents the dielectric losses, $U$ the operating voltage, $\omega$ the singular frequency and $\epsilon C_o$ the capacity of the cable. A very small factor, tangent $\delta$, of approximately $5 \times 10^{-5}$ which is extremely difficult to achieve using known cable insulating materials, such as those used in connection with high voltage oil cables is necessary since the dielectric losses $V_d$ must be removed in a superconducting cable by the refrigeration equipment which operates at low efficiency. For example, it takes 400 W of refrigeration to remove to the atmosphere losses on the order of 1 W occurring at the helium temperature. The use of paper insulation having a loss factor tangent $\delta$ of several times $10^{-3}$ such as is used in oil cable technology is therefore out of the question for use in superconducting cables.

"Elektrotechnische Zeitschrift," Series A, Vol. 92 (1971), pages 740 to 745, teaches the use of helium impregnated foil insulation, in which for example, polyethylene, polytetrafluorethylene or polyfluorethylene propylene is used as the foil material to form insulation between concentric conductor layers. Insulation comprising individual layers of foil which may also be saturated with the coolant of the cable is more advantageous for deep-cooled cables than insulation of solid plastic material which has a thermal contraction differing greatly from that of the metallic cable conductors. The cooling liquid saturated foil insulations often has a higher dielectric strength than the cooling liquids themselves and have relatively low dielectric losses. According to data in "Report BNL 50 325," Brookhaven National Laboratories, March, 1972, dielectric loss factors are approximately $2 \times 10^{-5}$. However, the dielectric constant $\epsilon$ of these plastics is relatively high. Polyethylene, for example, has an $\epsilon$ of about 2.25. This in turn can cause higher dielectric losses.

A further principal difficulty in operating a deep-cooled cable is the different shrinkage of the materials used. The shrinkage of the metal of the conductors is about 2 to 4 parts per thousand whereas the above mentioned plastics have a shrinkage of up to several percent. As a result, a strong axial pull will be exerted on rigid plastic insulation arranged between the conductor layers when the cable is cooled down. However, since the adhesion forces of two adjacent foils are large in the case of polyethylene, the danger of a foil package wound with such foil being town apart in one or a number of places due to the large forces acting on it exists.

In German Offenlegungsschrift No. 1,490,320, layered insulation for high voltage purposes consisting of layers of plastic foil with interposed layers of tape fabric permeable for a liquid impregnant, e.g., oil, and whose dielectric constant is approximately equal to that of the plastic foil is disclosed. The disclosed purpose of the insulation arrangement therein, however, is to insure proper impregnation of the insulation and to make possible a voltage gradient within the insulation which is as uniform as possible.

In view of these various difficiencies in prior art insulation for superconducting cables, it is the object of the present invention to create plastic insulation having sufficient mechanical elasticity for operation at cryogenic temperatures without appreciable degradation of its dielectric loss factor when compared to solid plastic insulation.

SUMMARY OF THE INVENTION

The solution to this problem provided by the present invention is based on the discovery that the basic arrangement disclosed in German Offenlegungsschrift No. 1,490,320 is suited to solve this problem. In accordance with the present invention, insulation having the required properties is obtained by arranging layers of spun bonded paper of high density polyethylene fibers between layers of insulating foil to form multi-layer insulation for deep-cooled cables.

Unlike the prior art multi-layer foil arrangement, the individual layers of the multi-layer insulation of present invention are movable relative to each other even at cryogenic temperatures so that the forces acting on the multi-layer insulation in the direction of the axis of the cable are considerably reduced to the extent that destruction of the multilayer insulation is impossible. Furthermore, the multi-layer insulation can be impregnated uniformly with the coolant of the cable so that voids in the insulation cannot occur, which voids would reduce its dielectric strength.

BRIEF DESCRIPTION OF THE DRAWINGS

The single FIGURE shows in schematic longitudinal cross section a single coaxial phase conductor of the superconducting three-phase cable having multi-layer insulation according to the present invention.

DETAILED DESCRIPTION OF THE PREFERRED EMBODIMENT

The single FIGURE illustrates two coaxial conductors with the multi-layer insulation of the present invention between the two conductors. Thus, there are shown conductors 2 and 3 each of which is a tubular conductor and which are concentric to each other. Conventionally these will comprise respectively the outgoing and return conductors of a single phase in a threephase cable. The outgoing conductor 2 will normally be at high voltage potential with the return conductor 3 surrounding it at ground potential. Typically, the outgoing and return conductors 2 and 3 will comprise a multiplicity of individual superconducting wires 4 and 5 which may be stabilized with a normally conducting metal such as copper or aluminum. Only a few of the individual wires 4 and 5 are shown on the FIGURE. These individual wires 4 and 5 are arranged side by side with the wires 4 on the inside of tubular insulation, designated generally as 6, and the wires 5 on the outside of this same insulation 6. As shown, the tubular insulation 6 has an inside diameter $R_i$ and an outside diameter $R_a$. In well known fashion these individual wires can be arranged so that the overall conductor maintains a constant length irregardless of temperature changes. For example the arrangement taught in German Auslegeschrift No. 1,814,036 may be used. To accomplish the constant length, the wires or ribbons applied to a cylindrical carrier in a single layer must have a pitch angle $$\theta = \arcsin \sqrt{\alpha L./\alpha_s}$$

with respect to the longitudinal axis of the conductor where $\alpha_L$ and $\alpha_S$ are the coefficients of expansion of the conductors and the carrier, respectively.

In order not to limit the transport current in the conductor appreciably, the pitch angle of the individual conductors must be chosen as large as possible since this also results in a large ratio of the two coefficients of expansion. For all practical purposes, only plastics can be considered as carriers since their coefficient of expansion is about one order of magnitude larger than that for metals. Thus, plastic multilayer insulation 6 is arranged between the outgoing and return conductors 2 and 3. It serves as the mechanical support for the return conductor 3 and contains a multiplicity of individual very thin layers of plastic foil 7 of which only three layers 9 to 11 are shown on the FIGURE. The thickness of these layers is exaggerated to more clearly explain the invention. It will be recognized that these layers will be much thinner than shown and the number of layers will be much greater. The preferred material for the layers 9 to 11 is high density polyethylene. This material has a small dielectric loss factor tan δ, of about $2 \times 10^{-5}$. In addition to high density polyethylene, which at cryogenic temperatures has better elasticity than low density polyethylene, other plastics such as polypropylene or polytetrafluorethylene can be used. In general, these unpolarized plastics have a small dielectric loss factor tangent δ of a few times $10^{-5}$. Between each two respective layers 9 through 11 of high density polyethylene foil a layer 12 or 13 of spun bonded paper fabric 15 is placed. According to the present invention, layers 12 and 13 consist of pure high density polyethylene fibers. The individual layers of the plastic foils 7 and the spun bonded paper fabrics 15 are subdivided in the direction of the axis into regular sections, as indicated in the FIGURE by gaps 17. Typically, these gaps will be produced by winding the individual layers with the plastic foil 7 and plastic fabric 15 in tape form so that they form respective helices about the inner phase conductor 2 or the layer below being wound over, with the pitch of the helix being slightly greater than the width of the tape. The winding directions of the individual layers may crossed provided that the formation of major voids which can fill with coolant is avoided in the multi-layer insulation.

The arrangement of the inner and outer conductors 2 and 3 with the multi-layer insulation 6 in between is disposed on an insulator 20 not shown in detail in the FIGURE. The insulator 20 will preferably be elastic and may comprise, for example, a hollow cylindrical, spirally-wound plastic body.

In general, coaxial conductor configurations having minimal eddy current losses are used for superconducting three phase cables. Advantageously, the pitch angle of the outgoing and return conductors 2 and 3 will be chosen equal, since otherwise complete shielding of the magnetic field in the space external to the conductor is not possible. Because of the requirement for equal pitch angle, materials with the same coefficient of expansion must be used for both the inner insulator 20 and the electrical multi-layer insulation 6. Thus, high density polyethylene is advantageous as a material for the insulator 20. It is also advantageous, since it has the largest coefficient of expansion among the plastics mentioned above. This results in smaller pitch angles for the individual conductors. Similar values with regard to thermal contraction as those found in the insulator 20 are also obtained in the electrical multi-layer insulation 6 of high density polyethylene foil and spun bonded paper of high density polyethylene fibers even though low pressure polyethylene fabric alone has considerably smaller coefficients of expansion.

Between outgoing and return conductors 2 and 3 and the multi-layer insulation 6 a further potential foil 21 or 22 for smoothing where conductors of individual adjacent wires 4 or 5 or adjacent conductor ribbons are used may be provided. If solid tubular conductors are used these potential foils 21 and 22 are unnecessary.

When the phase conductor is cooled down, the multi-layer insulation 6 of the present invention will advantageously pull apart somewhat in the axial direction of the conductor due to its sectionalization with regard to the layers 9 to 13. The spun bonded paper of high density polyethylene fabric 15 between the individual layers 9 to 11 facilitates mutual shifting of the individual layers of the insulation. The different shrinkage between the metallic layers of the outgoing and the return conductors 2 and 3 and the multi-layer insulation 6 can thus be equalized without too strong a pull being exerted on the multi-layer insulation 6 from the ends of the conductor. Were such equalization not present this pull could lead to the destruction of the multilayer insulation 6. Moreover, the conductor retains its desired flexibility. The conductor according to the present invention can be made having outgoing and return conductors consisting of individual adjacent, niobium-coated aluminum wires of about $3 \times 10^{-3}$m diameter. A cable of this nature can be designated, for example, for transmitting currents of $10^4$A at an operating voltages of 64 kV r.m.s. The power transmitted by a superconducting three-phase cable with three such phases is thus approximately 2,000 MVA. The radii shown on the FIGURE for such a cable will be respectively $R_i \times 3 \times 10^{-2}$ and $R_a = \times 5 \times 10^{-2}$m. The tubular multi-layer insulation, which will thus be about 2 cm thick between the two conductors, is built up of about 100 layers of high density polyethylene foil. Each foil layer is about 0.1 mm thick and has a dielectric strength of 14 kV minimum if wetted by liquid helium. Between each two foils a spun bonded paper of 100% high density polyethylene fiber, about 0.1 mm thick is arranged. The spun bonded paper fabric, which is saturated with liquid helium from the cable, has a dielectric strength of 2.5 kV min. The multi-layer insulation comprising 100 layers of foil and 100 layers of spun bonded paper fabric is produced by winding the individual layers helically in the longitudinal direction of the conductor. The width of the foil and spun bonded paper fabric in tape form is about 2 to 4 cm. Thus, the individual layers are divided into sections 2 to 4 cm long in the axial direction of the conductor. The difference in shrinkage between the multi-layer insulation and the outgoing and return conductors which occurs when cooling down to the temperature of liquid helium is absorbed through the ability of the multi-layer insulation to expand. In addition, adequate flexibility of the overall conductor is ensured by the relatively thin design of the foil and the spun bonded paper fabric. Furthermore, the helium used for cooling the niobium-coated aluminum wires advantageously penetrates the multi-layer insulation. This results in uniformly high dielectric strength in the multi-layer insulation.

Thus, an improved multi-layer insulation arrangement for deep-cooled cables such as superconducting cables has been shown. Although a specific embodiment has been illustrated and described, it will be obvious to those skilled in the art that various modifications may be made without departing from the spirit of the invention which is intended to be limited solely by the appended claims.

We claim:

1. A multi-layer electrical insulation employing insulating foils having a dielectric loss factor smaller than $5 \times 10^{-5}$ for use in deep-cooled cables such as superconducting three-phase cables in a coaxial conductor configuration, comprising:
   a. a plurality of layers of insulating foil selected from the group consisting of high density polyethylene, polypropylene and polytetraflourethylene having a dielectric loss factor smaller than $55 \times 10^{-5}$; and
   b. layers of spun bonded paper of high density polyethylene fibers between each two layers of said insulating foil.

2. Multi-layer insulation according to claim 1 wherein the thickness of the layers of insulating foil is approximately equal to the thickness of the layers of spun bonded paper fabric.

3. Multi-layer insulation according to claim 1 wherein the insulating foil consists of high density polyethylene.

4. A multi-layer insulation according to claim 1 wherein the insulation is impregnated with a liquid helium coolant of the deep-cooled cable.

* * * * *

UNITED STATES PATENT AND TRADEMARK OFFICE
CERTIFICATE OF CORRECTION

PATENT NO. : 3 959 549

DATED : May 25, 1976

INVENTOR(S) : Peter Penczynski et al

It is certified that error appears in the above-identified patent and that said Letters Patent are hereby corrected as shown below:

Column 6, line 24, delete "55" and substitute --5--

Signed and Sealed this

Fifth Day of October 1976

[SEAL]

Attest:

RUTH C. MASON
*Attesting Officer*

C. MARSHALL DANN
*Commissioner of Patents and Trademarks*